United States Patent [19]
Martin

[11] Patent Number: 5,406,333
[45] Date of Patent: Apr. 11, 1995

[54] METHOD AND DEVICE FOR FILM-MODE DETECTION

[75] Inventor: Alix Martin, Paris, France

[73] Assignee: Thomson Consumer Electronics, Inc., Indianapolis, Ind.

[21] Appl. No.: 212,529

[22] Filed: Mar. 14, 1994

[51] Int. Cl.⁶ .............................................. H04N 7/01
[52] U.S. Cl. .................................. 348/449; 348/448; 348/558
[58] Field of Search ............... 348/448, 449, 558, 911; H04N 7/01

[56] References Cited

U.S. PATENT DOCUMENTS

| | | | |
|---|---|---|---|
| 4,641,188 | 2/1987 | Dischert | 358/140 |
| 4,703,358 | 10/1987 | Flannaghan | 358/167 |
| 4,837,626 | 6/1989 | Nishiyama et al. | 348/558 |
| 4,982,280 | 1/1991 | Lyon et al. | 348/448 |
| 5,111,511 | 5/1992 | Ishii et al. | 382/1 |
| 5,187,575 | 2/1993 | Lim | 348/558 |
| 5,191,427 | 3/1993 | Richards et al. | 358/214 |

Primary Examiner—Victor R. Kostak
Attorney, Agent, or Firm—Joseph S. Tripoli; Eric P. Herrmann; Ronald H. Kurdyla

[57] ABSTRACT

A method for determining which of pairs of successive video fields have interlace scan characteristics includes generating accumulated differences FD of pixels in successive lines of respective fields of successive pairs of fields and generating accumulated differences FR of pixels in successive lines of interlaced said pairs of fields. The accumulated differences FD and FR are compared and pairs of said fields are classified as interlaced if the ratio of accumulated differences FR/FD is greater than a predetermined threshold value.

7 Claims, 3 Drawing Sheets

METHOD AND DEVICE FOR FILM-MODE DETECTION

This invention relates to a method and apparatus for determining if a video signal has characteristics of signal originated in interlaced scan mode i.e., video mode or has characteristics of signal originated as non-interlaced scan or film mode.

BACKGROUND OF THE INVENTION

Certain high end television receivers include apparatus to enhance the apparent resolution of reproduced images by, for example, converting interlaced scanned images to non-interlace scanned images. Apparatus of this type typically introduces image artifacts in areas of image motion. These artifacts can be significantly reduced with knowledge of whether the source material was originally generated as interlace scanned video or as non-interlace scanned video or film. In addition video signal compression systems, particularly for use with NTSC video signals, can realize a twenty percent compression bonus if the source video can be determined to have been originated as film and converted to video by the technique known as 3:2 pull down. Video signal generated via 3:2 pulldown includes one duplicated field in every 5 field sequences, which duplicate fields may be excised to realize the compression bonus.

SUMMARY OF THE INVENTION

The method according to the invention forms the sums FD of differences between vertically aligned pixels of adjacent lines in exclusive fields, and forms the sums FR of differences of vertically aligned pixels of adjacent lines in frames including one of said exclusive fields and an adjacent field. The ratio FR/FD is generated and compared with a predetermined value and if the ratio is greater than the predetermined value it is characterized as having been originated as interlace scanned video. The invention will be described with greater specificity with the aid of the following drawings.

DETAILED DESCRIPTION

Figure 1:
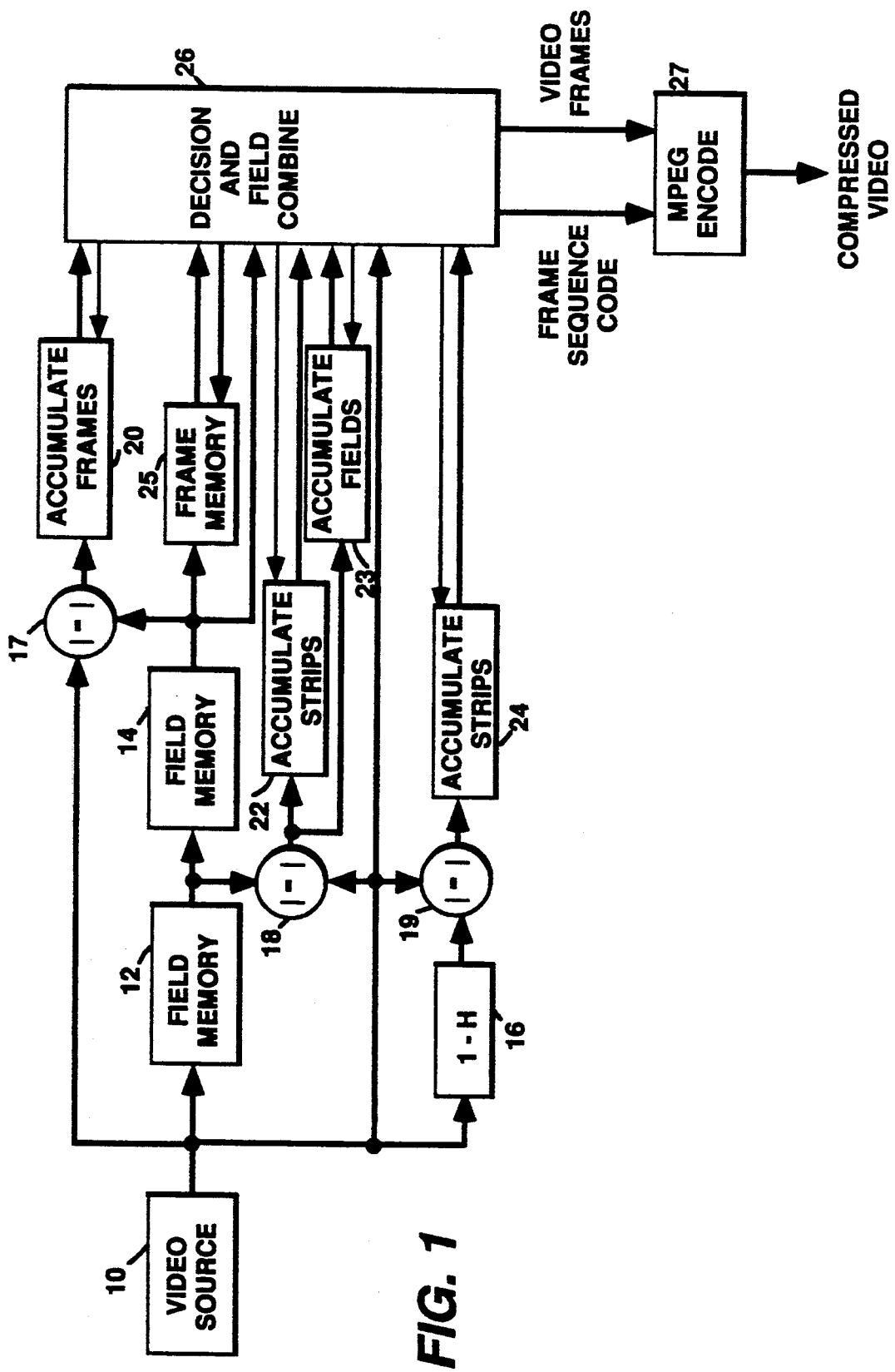
FIG. 1 is a block diagram of an interlace/non-interlace field characterizer embodying the present invention.

Referring to FIG. 1, video signal to be analyzed for interlace scan characteristics is provided from a source 10 which may be a video recorder. The video signal is coupled to an input terminal of a field memory 12, an input terminal of a one horizontal line memory 16, and to respective first input terminals of subtractors 17, 18 and 19. The video signal is delayed by one field interval in the memory 12 and the delayed video signal is coupled to a second similar field memory 14 and to a second input terminal of the subtractor 18. The video signal is delayed by one horizontal line interval in the memory 16, the output of which is coupled to a second input terminal of the subtractor 19. Video signal applied to the memory 14 is delayed for a second field interval and coupled to a second input terminal of the subtractor 17, to the input terminal of a buffer storage frame memory 25, and to the Decision and Field Combine circuitry 26.

Each of the subtractors 17, 18 and 19 provide at their respective output terminals the magnitude of the differences of the signals applied to their respective input terminals. Subtractor 17 provides the magnitudes of the differences of the amplitudes of corresponding pixels in successive frames. These magnitude values are accumulated over respective frame intervals. It has been determined to be advantageous to accumulate magnitude values only over the active picture portions of respective frame intervals. The accumulation period is controlled by the circuit 26, and accumulated magnitude values for respective frames d(j, j+2) are captured and stored by the circuit 26.

The subtractor 18 provides the magnitudes of the differences of the amplitudes of corresponding pixels in successive fields. That is, subtractor 18 provides the magnitudes of the differences of pixels in adjacent lines in a frame comprised of two successive fields j and j+1. The magnitudes of the differences from exclusive pairs of lines are accumulated during the active picture interval in accumulator 22. Preferably the magnitudes are accumulated over strips FR(k) of the frame with each strip including about 16 line intervals. The accumulation intervals are controlled by the circuit 26 which captures and stores accumulated values for respective strips.

Let Y(m, n) be the luminance value at coordinates (x=m, y=n) in the current frame, and k be the strip number (k=0, ... 14 for NTSC and k, ... 17 for PAL). For each strip in the luminance plane, the accumulated differences FR(k) of pixels belonging to opposite fields, i.e., adjacent lines in a frame are equal to $$\sum_{n=16k}^{16k+15} \sum_{m=16}^{703} |Y(m, 2n) - Y(m, 2n + 1)|.$$

The subtractor 19 provides the magnitudes of differences of vertically aligned pixels in adjacent lines in exclusive fields. These differences, for exclusive line pairs, are accumulated over the active picture interval for strips FD(k) of respective fields. The accumulation intervals are controlled by the circuit 26 which captures and stores accumulated values for respective strips. For each strip in the luminance plane, the accumulated differences FD(k) of pixels belonging to exclusive fields, i.e., adjacent lines in a field are equal to $$\sum_{n=8k}^{8k+7} \sum_{m=16}^{703} (|Y(m, 4n) - Y(m, 4n + 2)| +$$

$$|Y(m, 4n + 1) - Y(m, 4n + 3)|)$$

The line numbering for both field and frame strips assumes ordinal line numbering over a frame interval. That is, lines in the even fields are numbered 0, 2, 4, .. . etc. and lines in the odd numbered fields are numbered 1, 3, 5, 7, etc.

The differences generated by the subtractor 18 are also coupled to a further accumulator 23, which accumulates the pixel differences over the entire active portion of respective fields. The accumulated values over a frame d(j, j+1) are captured and stored by the circuit 26, for use in determining which of respective fields are to be excised from the field sequence.

The Decision and Field Combining Circuit 26 of FIG. 1 performs two functions. The first is to determine if successive fields comprise interlace scan fields, and secondly, based on this determination to combine fields into frames for application to video signal compression apparatus which compresses video signal on a frame by frame basis.

Figure 2:
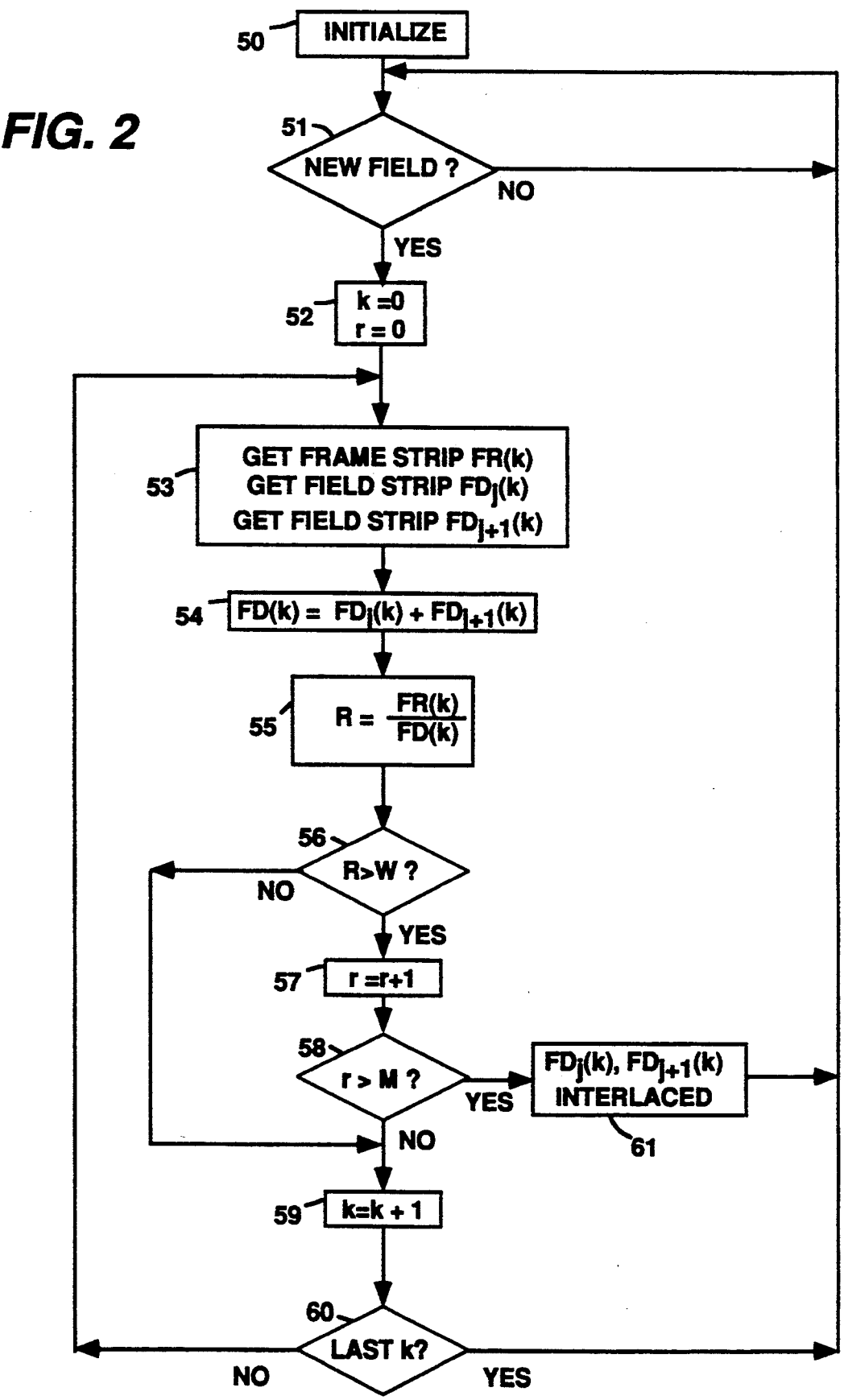
FIG. 2 is a flow chart of the operation of a first aspect of the FIG. 1 apparatus.

The operation of the first function is illustrated by the flow chart of FIG. 2. Two successive fields, j and j+1, are used for this analysis. The system is initialize at a step 50 which occurs when the circuitry is energized. Initialization involves setting respective index values to zero. After initialization the system waits {51} for the next field to occur. When a new field occurs two indices k and r are set to zero. The k index is a strip index number and the r index is a count of a measurement event to be described subsequently. Once the indices are reset, a stored accumulated magnitude value FR(k) for strip k is accessed {53} from memory. Recall that the value FR(k) corresponds to line-to-line pixel differences within a frame comprised of fields j and j+1. The stored accumulated magnitude values $FD_j(k)$ and $FD_{j+1}(k)$ are also accessed {53} from memory. These values correspond to line-to-line pixel difference values within respective fields j and j+1.

The values $FD_j(k)$ and $FD_{j+1}(k)$ are added together in step {54} to form the value FD(k). The ratio R=FR(k)/FD(k) is calculated {55}. This ratio is compared {56} to a predetermined threshold value W (such as 1). If the ratio is less than the threshold a jump is made to step {59}. If the ratio is greater than the threshold the index r is incremented by one unit {57}.

The index r is examined {58} to determine whether it is greater or lesser that a second predetermined threshold value M. If it is greater than M, the frame consisting of fields j and j+1 are presumed to exhibit interlaced characteristics. That is, there is for example, apparent motion between the successive fields, and motion cannot occur between field intervals of film sourced video or progressive scanned video. The inventors have determined that if three strips exhibit a ratio R greater than W (i.e., M=3), this is sufficient information to consider the frame to consist of interlaced fields. After classifying a frame as interlaced, the system returns to step {51} to await the next field.

If at step {58} the index r is not greater than M, the strip index k is incremented by one unit {59}. A test is performed {60} to determine if all strips have been processed. If so the system jumps to step {51} to await the next field, and if not the system jumps to step {53} to process the next strip.

Figure 3:
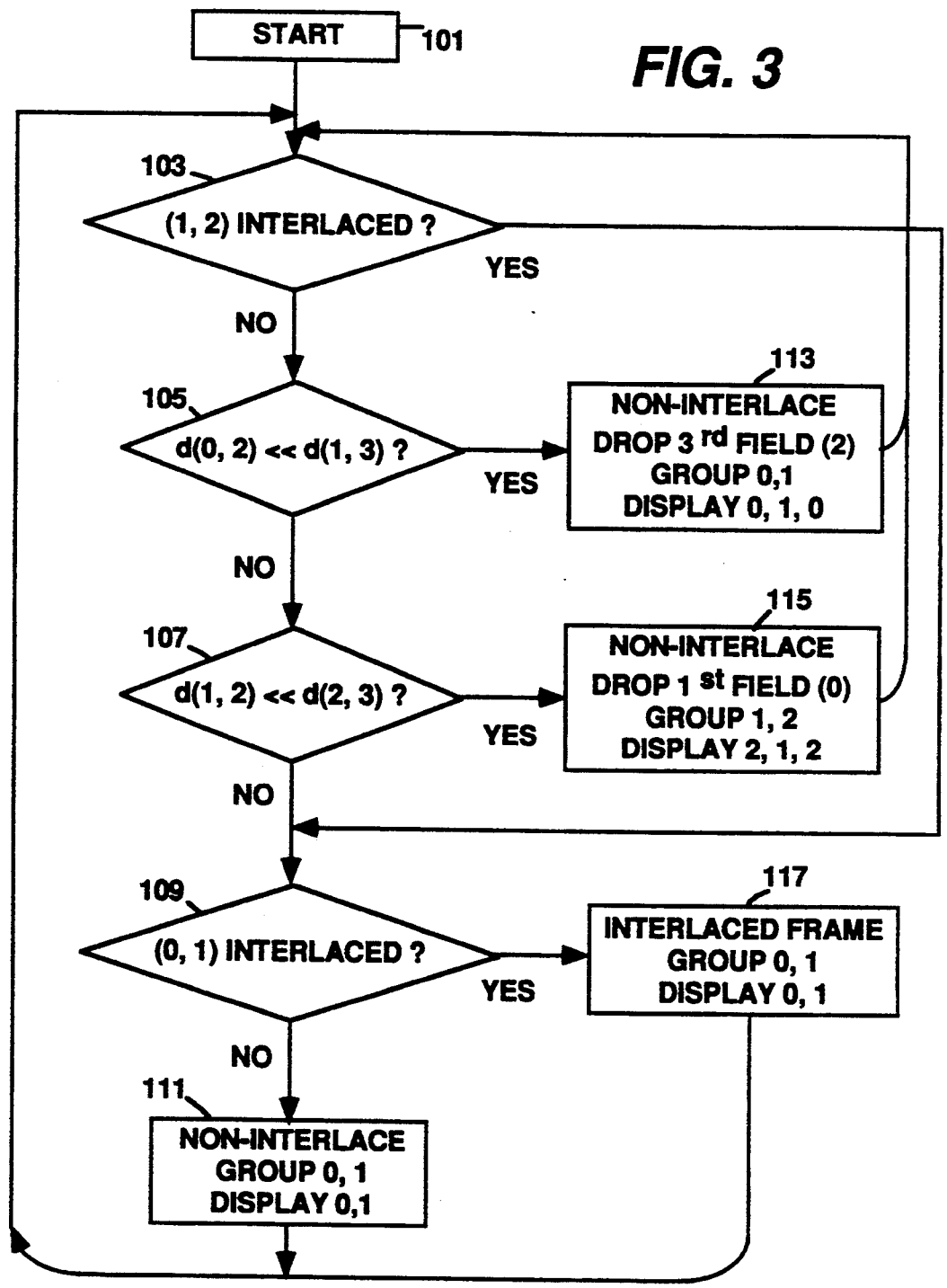
FIG. 3 is a flow chart of the operation of a second aspect of the FIG. 1 apparatus.

In a video signal compression system it is desirable to excise repeated fields of information, and in lieu of transmitting the excised fields in compressed form, to transmit a code to indicate that the field has been excised and that a given transmitted compressed field may be repeated as a substitute for the excised information. FIG. 3 is a flowchart which illustrates this function which is performed by the Decision and Field Combine element 26. In performing this function the system uses the interlace/non-interlace determinations of two frames (four fields 0, 1, 2, 3) from the input field sequence to make all decisions. The numbers 0, 1, 2, 3 refer to each consecutive set of occurring four fields and field 0 may be an even or odd field.

Referring to FIG. 3, this function is initialized {101} to determine if sufficient field information is available, and then accesses the interlace/non-interlace classifications of fields (1,2) and (0,1). A test {103} is performed to determine if fields 1 and 2 are interlaced. If they are, the system jumps to step {109} where a test is performed to determine if fields (0,1) are interlaced. If they are determined not to exhibit interlaced characteristics, fields 0 and 1 are grouped {111} as a frame and indicated as being non-interlaced. A code is generated to indicate that they should be displayed in the field order 0, 1. Alternatively, if they do exhibit interlaced characteristics, fields 0 and 1 are grouped {117} as a frame and indicated as being interlaced. A code is generated to indicate that they should be displayed in the field order 0, 1.

Alternatively at step {103}, if the fields (1, 2) are indicated as non-interlaced, a test is performed to determine if field 2 is substantially similar to field 0 and field 1 is dissimilar to field 3. This is accomplished by comparing the accumulated pixel differences d(0, 2) between fields 0 and 2 with the pixel differences d(1, 3) between fields 1 and 3. (The differences d(0, 2) and d(1, 3) are provided by the subtracter 17 and accumulator 20). If the differences d(0, 2) are significantly smaller than the differences d(1, 3), the assumption is made {113} that the source video signal is non-interlaced, for example it may have been generated by the process known as 3:2 pulldown. The third field (field 2) is excised from the video signal, and fields 0 and 1 are grouped as a frame. A code is generated indicating that field 2 has been excised and that fields 0 and 1 should be displayed (when recovered and decompressed) in a three field interval with the field sequence 0, 1, 0. The system returns to step {103} and waits for the next fields.

At step {105}, if the differences d(0, 2) are not significantly smaller than the differences d(1, 3), a further test {107} is performed. This test is included to detect the special case where an isolated field is included which is basically out of sequence such as may occur during editing. The accumulated pixel differences d(1, 2) between fields 1 and 2 are compared with the pixel differences d(2, 3) between fields 2 and 3. (These differences are provided by accumulator 23.) If the differences d(1, 2) are significantly smaller than the differences d(2, 3), the assumption is made {115} that an isolated field (field 0) is present, which field is excised from the field sequence. Fields 1 and 2 are grouped as a frame and a code is generated indicating that upon recovery and decompression the fields 1 and 2 should be displayed in the three field sequence 2, 1, 2. Thereafter the system returns to step {103} and waits for the next fields.

If the differences d(1, 2) are not significantly smaller than the differences d(2, 3), fields 0, 1 are tested {109} for interlace. If fields 0 and 1 are interlaced they are grouped as a frame and a code is generated indicating that they should be displayed in the sequence 0, 1. Alternatively, the fields are grouped 0, I and a code is generated {111} indicating they are not interlaced but should be displayed in the sequence 0, 1. The system then returns to step {103}.

At step {105}, it has been found that an inequality in the order of about 1:5 or greater is satisfactory. At step {107}, it has been found that an inequality in the order of 3.0 or greater is satisfactory.

Referring again to FIG. 1, at least the former two fields 0 and 1 of fields 0, 1, 2, and 3 are available to the Decision and Field Combiner from the frame memory 25, when respective grouping decisions are completed. Field 2 is available from field memory 14 and field 3 is available from field memory 12. Depending on the grouping decision, appropriate fields are combined as frames and provided to the MPEG compressor/encoder 27. In addition the respective codes indicating excised fields and field display sequences are passed to the MPEG compressor/encoder 27 for inclusion in the encoded video signal for storage or transmission.

What is claimed is:

1. Apparatus for determining which pairs of video fields have interlace scan characteristics comprising, means for generating accumulated differences FD of pixels in successive lines of respective fields of successive pairs of fields; means for generating accumulated differences FR of pixels in successive lines of interlaced said pairs of fields; and means for comparing said differences FD and FR and classifying pairs of said fields as interlaced if the ratio FR/FD is greater than a predetermined threshold value.

2. The apparatus set forth in claim 1 further comprising means for accumulating said differences FD and FR over portions of respective fields and generating respective ratios FR/FD for respective portions and classifying pairs of said fields as interlaced if the ratios for a predetermined number of portions are greater than said predetermined threshold, where said predetermined number of portions comprise less than a full field/frame.

3. The apparatus set forth in claim 2 wherein respective portions comprise 16 horizontal lines.

4. The apparatus set forth in claim 2 wherein said predetermined number of portions is three.

5. The apparatus set forth in claim 1 wherein said means for generating accumulated differences FD of pixels in successive lines of respective pairs of fields and accumulated differences FR of pixels in successive lines of interlaced said pairs of fields, generates such differences for mutually exclusive pairs of lines.

6. A method for determining which of pairs of successive video fields have interlace scan characteristics comprising: generating accumulated differences FD of pixels in successive lines of respective fields of successive pairs of fields; generating accumulated differences FR of pixels in successive lines of interlaced said pairs of fields; comparing said differences FD and FR and classifying pairs of said fields as interlaced if the ratio of accumulated differences FR/FD is greater than a predetermined threshold value.

7. The method set forth in claim 6 further comprising: accumulating said differences FD and FR over portions of respective fields; generating respective ratios FR/FD for respective portions; and classifying pairs of said fields as interlaced if the ratios FR/FD for a predetermined number of said portions are greater than said predetermined threshold, where said predetermined number of portions comprise less than a full field/frame.

* * * * *